(12) United States Patent
Shridhar

(10) Patent No.: US 12,393,604 B2
(45) Date of Patent: Aug. 19, 2025

(54) SYSTEMS AND METHODS FOR PREVENTING DATABASE DEADLOCKS DURING SYNCHRONIZATION

(71) Applicant: SAP SE, Walldorf (DE)

(72) Inventor: Archana Shridhar, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/523,246

(22) Filed: Nov. 29, 2023

(65) Prior Publication Data

US 2025/0173355 A1 May 29, 2025

(51) Int. Cl.
*G06F 16/27* (2019.01)
*G06F 16/23* (2019.01)

(52) U.S. Cl.
CPC .......... *G06F 16/27* (2019.01); *G06F 16/2386* (2019.01)

(58) Field of Classification Search
None
See application file for complete search history.

(56) References Cited

U.S. PATENT DOCUMENTS

| | | | | |
|---|---|---|---|---|
| 5,924,098 A * | 7/1999 | Kluge | ................ | G06F 16/9024 |
| 5,940,818 A * | 8/1999 | Malloy | ................ | G06F 16/283 |
| 6,711,563 B1 * | 3/2004 | Koskas | ................ | G06F 16/284 |
| | | | | 707/769 |
| 6,839,711 B1 * | 1/2005 | Reddy | ................ | G06F 16/283 |
| | | | | 707/999.102 |
| 6,907,422 B1 * | 6/2005 | Predovic | ................ | G06F 16/284 |
| 7,818,723 B2 * | 10/2010 | AliKacem | ................ | G06F 11/3668 |
| | | | | 717/131 |
| 8,122,012 B2 * | 2/2012 | Dettinger | ................ | G06F 16/20 |
| | | | | 707/722 |
| 8,983,954 B2 * | 3/2015 | Platt | ................ | G06F 16/38 |
| | | | | 707/736 |
| 2005/0004936 A1 * | 1/2005 | Potapov | ................ | G06F 16/284 |
| 2008/0027788 A1 * | 1/2008 | Lawrence | ................ | G06Q 30/02 |
| | | | | 705/7.33 |
| 2008/0059492 A1 * | 3/2008 | Tarin | ................ | G06F 16/221 |
| 2008/0187007 A1 * | 8/2008 | Goyal | ................ | H04L 67/1095 |
| | | | | 370/465 |
| 2012/0030323 A1 * | 2/2012 | Matsuno | ................ | H04L 43/0817 |
| | | | | 709/221 |
| 2015/0026604 A1 * | 1/2015 | Mulukuri | ................ | G06F 16/9535 |
| | | | | 715/758 |
| 2016/0078064 A1 * | 3/2016 | Sassin | ................ | G06F 16/211 |
| | | | | 707/606 |
| 2020/0302391 A1 * | 9/2020 | Li | ................ | G06Q 10/0875 |
| 2021/0334288 A1 * | 10/2021 | Xu | ................ | G06F 16/254 |

(Continued)

*Primary Examiner* — Sherief Badawi
*Assistant Examiner* — Jessica N Le
(74) *Attorney, Agent, or Firm* — Fountainhead Law Group, PC

(57) ABSTRACT

Embodiments of the present disclosure include techniques for storing and updating data in a database. In one embodiment, data elements are stored in a many to one relationship in different tables. When data updates occur, the records to be updated are divided into batches and sorted. Database transactions to update the batches are performed in parallel. When one transaction accesses a record in the database, the record is locked. Other batches accessing the locked record may wait until the record is unlocked to complete their updates. The present techniques may improve database processing by reducing or eliminating database deadlocks, for example.

15 Claims, 4 Drawing Sheets

(56) References Cited

U.S. PATENT DOCUMENTS

| | | | |
|---|---|---|---|
| 2023/0259521 A1* | 8/2023 | Haelen | G06F 16/254 707/602 |
| 2024/0070147 A1* | 2/2024 | Ielkin | G06F 16/26 |

* cited by examiner

SYSTEMS AND METHODS FOR PREVENTING DATABASE DEADLOCKS DURING SYNCHRONIZATION

BACKGROUND

The present disclosure relates generally data management in computer systems, and in particular, to systems and method for preventing database deadlocks during synchronization.

Computer systems require data to produce useful and meaningful results. Data preparation and analytics can involve complex, time consuming preparation of relations, visualizations, and compilations of data. Such data compilations are often stored in interrelated database tables. However, when changes to the data occur, updating the database can be a challenge. In some cases, when multiple different data elements are associated with a common data element, updating the data can lead to deadlocks as the database attempts to change the same data as part of an update to multiple different other data elements.

The present disclosure addresses these and other challenges and is directed to techniques for preventing database deadlocks.

DETAILED DESCRIPTION

Described herein are techniques for preventing database deadlocks during synchronization. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
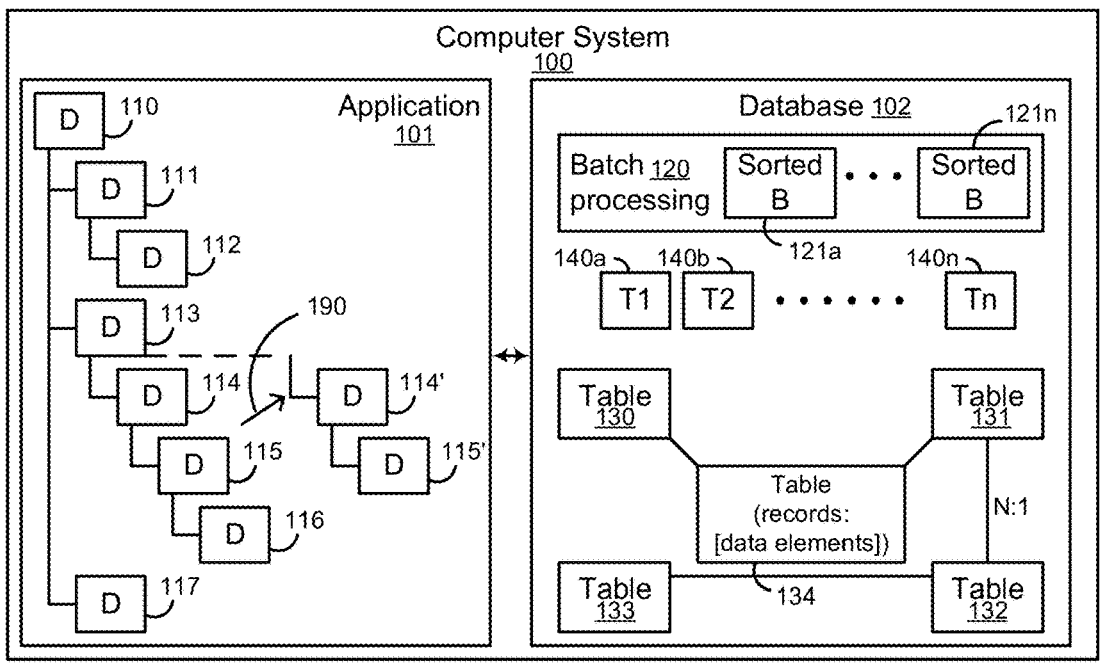
FIG. 1 illustrates a system for updating data according to an embodiment.

FIG. 1 illustrates a computer system 100 for updating data according to an embodiment. Features and advantages of the present disclosure include techniques for updating data in a database with prevents database deadlocks, for example. Computer system 100 may comprise multiple computers, such as a cloud computer system (e.g., a data center) or an on-premise network of computers, for example. Each computer may comprise one or more processors and various forms of memory for executing software performing the techniques described herein.

In this example, computer system 100 includes an application 101 and a database 102. Application 101 may be an application backend server, which implements functionality of application 101 in response to commands from a frontend user interface, for example. Database 102 stores data. In this example, data elements are stored in tables 130-134. Data elements may be stored in data records in tables 130-134.

Features and advantages of the present disclosure may be advantageously used to stored data linked in a hierarchy. For example, application 101 may allow a user to link data elements 110-117 in a hierarchy. Here, data element 112 is a child of data element 111, which is a child of root data element 110. Similarly, data element 116 is a child of data element 115, which is a child of data element 114, which is a child of data element 113, which is a child of root data element 110. Data element 117 is a child of root data element 110. As the data changes, the hierarchy may change. For example, a modification (illustrated by arrow 190) of data element 114 to 114' may result in a change in the hierarchy. In this case, data element 115' is now a child of data element 114'. Example data elements may be dimensions and values (e.g., aggregated values) described in more detail below.

As mentioned above, data elements are stored in database 102 in tables 130-134, which are linked to form the hierarchy. In this illustrative example, table 134 is linked to tables 130 and 131, table 131 is linked to table 132, and table 132 is linked to table 133. In various embodiments, one or more tables have a many to one relationship with another table. For example, table 131 may have a many to one relationship (N:1) with table 132. Accordingly, multiple records in table 131 are associated with one record in table 132, where data elements are stored as records in the tables of the database. For tables with a many to one relationship, groups of data elements in one table (e.g., table 131) may be associated with a same data element stored in another table (e.g., table 132). Embodiments of the present disclosure may advantageously update data elements in table 132 when modifications are made to a hierarchy changing an association between the groups of first data elements (e.g., in table 131) and corresponding same second data elements (e.g., in table 132). Such changes in a hierarchy may require different data elements in table 131 to be associated with data elements in table 132, for example. Associations between data elements across the tables may change as a result of a change in the hierarchy, and updating the database with such changes can be challenging where tables have one or more many to one relationships.

When a modification of the hierarchy is made that changes an association between groups of data elements in one table and a corresponding same data element in another table, the system may determine which same data elements have a changed association with the groups of data elements. For example, if the hierarchy changes such that a path in the hierarchy has different members, including a member in table 132, then data elements in table 132 may need to be updated. In one embodiment, updates may be performed using batch processing 120, which is shown here in database 102, for example. Data elements in table 132 having the changed association, and hence need to be updated, may be divided into batches 121a-n, which comprise subsets of the data elements in table 132 having the changed association, for example. Advantageously, the subsets of data elements in the batches may be sorted. As illustrated below, sorting prior to updating may help prevent database deadlocks, for example. After sorting, the batches of subsets of data elements having changed associations are updated by performing database transactions (T1–Tn) 140a-n in parallel.

For instance, a plurality of transactions may be illustrated by looking at two database transactions. When an update occurs and the batches are sorted, a first database transaction (T1) 140a may be performed on a first batch 121a having a first subset the second data elements having the changed association and a second database transaction (T2) 140*b* may be performed on a second batch 121*n* having a first subset the second data elements having the changed association (where "n" is an integer representing the total number of batches). Even though the batches are executed in parallel, the batches may not perform their functions at the same time if there is an update on the same database record. One of transactions T1 and T2 may be issued first (e.g., by a few milliseconds). Here, T1 may execute first, causing T2 to wait, putting T2 on hold. The first database transaction T1 may sequentially lock rows of a table comprising the data elements it is attempting to update (e.g., a first subset of the second data elements having the changed association in batch 121*a*). In some embodiments, the lock may cause other transactions, such as T2, to wait, for example. Next, the first database transaction T1 sequentially updates each row comprising the subset of the second data elements having the changed association with the new data values, for example. When T1 is finished updating the elements of the batch, it may unlock the rows of the table. The wait (or hold) command on T2 is removed, and T2 is executed. T2 sequentially locks rows comprising the second subset the second data elements having the changed association in the second batch and sequentially updates each row comprising the second subset of the second data elements having the changed association with the new data values. In some embodiments, additional transactions may be placed on hold if such transactions also are updating data in the same table as T1 and T2. Accordingly, additional database transactions may be sequentially executed as each of the other transactions unlocks the table after performing their updates. This technique may advantageously prevent database deadlocks, which can increase database processing time. Accordingly, the present techniques allow databases to run faster and more efficiently.

Figure 2:
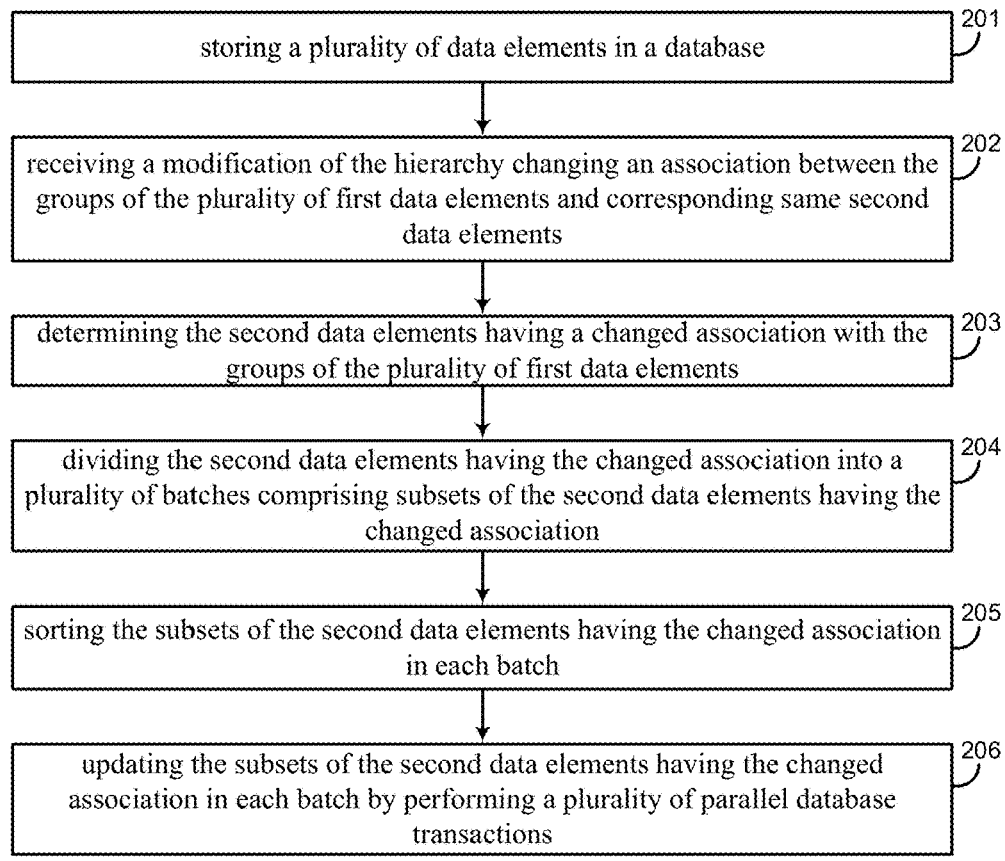
FIG. 2 illustrates a method of updating data according to an embodiment.

FIG. 2 illustrates a method of updating data according to an embodiment. At 201, a plurality of data elements is stored in a database. The database comprises a plurality of tables linked to form a hierarchy. The plurality of data elements may comprise a plurality of first data elements and a plurality of second data elements, for example. The plurality of first data elements is stored in a plurality of first records in a first table of the database. Groups of the plurality of first data elements are associated with the same second data elements of the plurality of second data elements stored in a plurality of second records in a second table of the database. When multiple data elements of one table are associated with the same data elements of another table, the tables are said to have a many to one relationship (N:1). Accordingly, the first table and the second table have a many to one relationship where multiple records in the first table are associated with one record in the second table. At 202, a modification of the hierarchy is received on a first computer system changing an association between the groups of the plurality of first data elements and corresponding same second data elements. As illustrated in the examples below, the modification may be a change of dimension which changes the association of a data element, such as a comment thread, to a data value. At 203, the system determines which second data elements have a changed association with the groups of the plurality of first data elements. Using the example above, the system may determine which dimensions have a changed association to comment threads. Such dimensions may be updated in one or more tables of the database, for example. At 204, the second data elements having the changed association are divided into a plurality of batches. The batches comprise subsets of the second data elements having the changed association. At 205, the subsets in each batch are sorted. At 206, the subsets of the second data elements having the changed association in each batch are updated in the database by performing a plurality of parallel database transactions.

Figure 3:
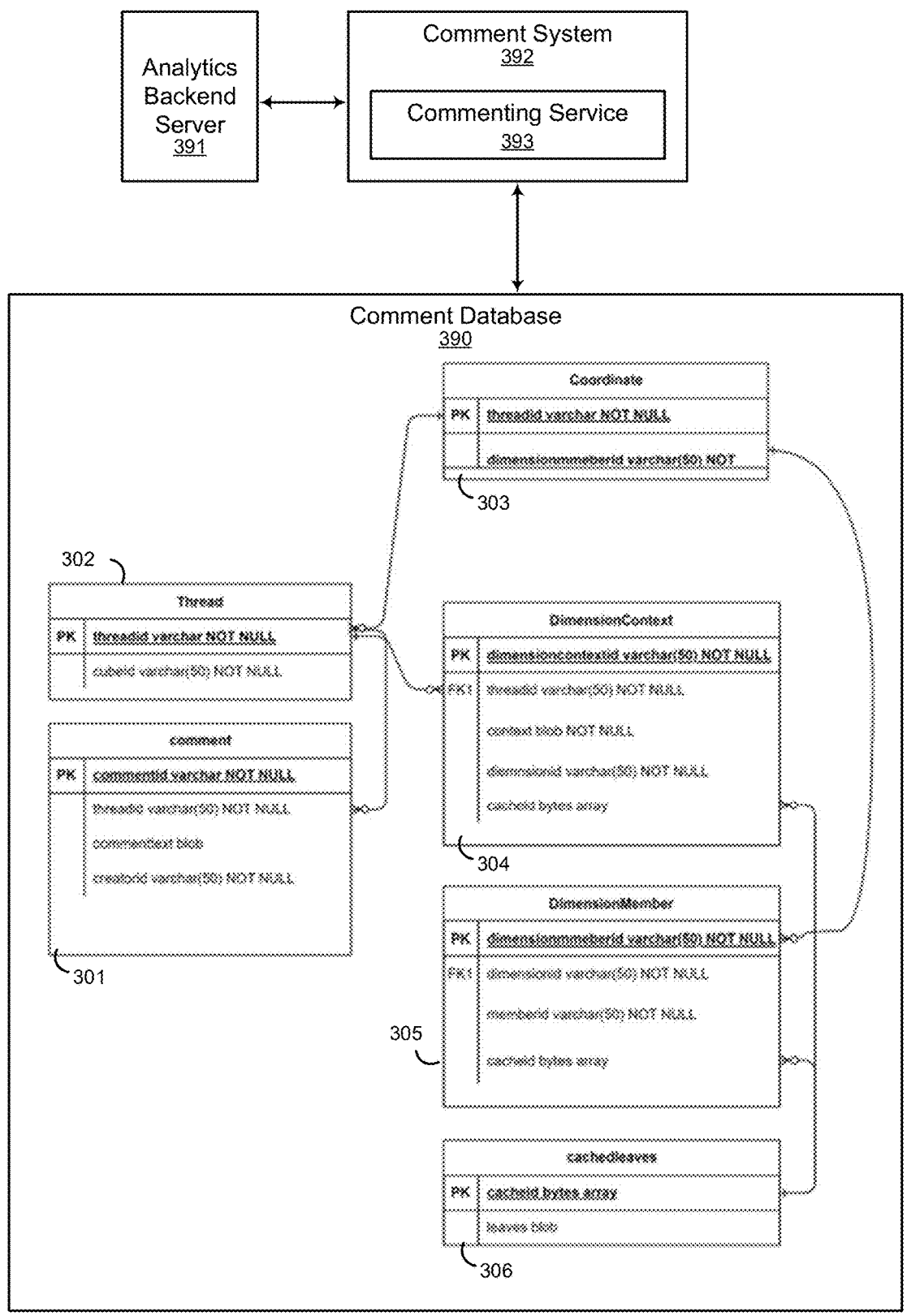
FIG. 3 illustrates example database tables according to an embodiment.

FIG. 3 illustrates example database tables according to an example embodiment. A commenting feature in a data analytics software system, such as SAP® Analytics Cloud, allows users to add/delete/view comments. There may be different flavors of commenting, such as story comments, datapoint comments, and dimension related comments. Datapoint comments can be added on any datapoint of a table in a story. This requires the commenting service to store the comment context with respect to the dimension members contributing to the datapoint. If the same datapoint is viewed in another story, which is built on the same data model, then the same comments should appear on this datapoint as well.

For these reasons, lifecycle of comment management becomes challenging because the comment context should synchronize with the ongoing addition/deletion of dimension members, or changes to the hierarchy of members in the underlying model. These changes impact the datapoint. Additionally, if comment context is not synchronized, modified comments cannot be viewed due to the context mismatch.

Hence there are dimension update events being triggered from by an analytics application, such as from an analytics backend server 391. A commenting system 392 listens to such events. Once an event is received for a particular dimension indicating a modification, a request is sent to a commenting service 393 to get the comment context which involves the given dimension. The comment context is then regenerated for the comments. The regenerated context is then sent back to the commenting service 393 via a series of batch requests with a maximum number (e.g., 500) of comment context each to update it back into a comment database 390.

Commenting service 393 may be a cloud microservice with multiple instances running. Accordingly, each batch of comment context update requests may be processed by different service instances at the same time. There can also be cases of other commenting operations like add, copy etc., which may be triggered at the same time. These requests translate to database operations to be performed on same set of commenting tables. There can be cases of particular table records to be updated by each of these transactions which will end with blocking queries leading to long running deadlocks and high CPU utilization for database 390.

In order to understand the complexity of the problem, consider the entities involved in commenting and their relations with each other. Referring again to FIG. 3, in this example, comments are coupled together in threads and linked to dimension members so that as dimensions change (e.g., in response to a user selecting different data to analyze across multiple possible dimensions), the comments and comment threads associated with the data values changes. Accordingly, the database may comprise comments table 301, threads table 302, coordinates table 303, dimension context table 304, dimension member table 305, and cached leaves table 306. As illustrated in FIG. 3, the Dimension Member table 305 has common entries across different comment threads. Accordingly, if a member of a dimension was part of datapoint 1 and 2. Then comments associated with both these datapoint points will have a common entry for that memberId in the DimensionMember table. A distinguishing entry may be for 3 entries in Coordinate table 303 with 3 different threadId.

For example, if User A adds a comment (test-comment1) on a datapoint which involves the following coordinates (Thread T1, comment C1):

| DimensionId | MemberId | Description |
|---|---|---|
| Product | PD21 | Alcohol |
| Location | CT2 | San Francisco |
| Account | GM1 | Gross Margin |

Additionally, User B may add a comment (test-comment2) on a datapoint which involves the following coordinates (Thread T2, comment C2):

| DimensionId | MemberId | Description |
|---|---|---|
| Product | PD26 | Juices |
| Location | CT2 | San Francisco |
| Account | GM1 | Gross Margin |

Further, User C may add a comment (test-comment3) on a datapoint which involves the following coordinates (Thread T3, comment C3):

| DimensionId | MemberId | Description |
|---|---|---|
| Product | PD30 | Carbonated Drinks |
| Location | CT2 | San Francisco |
| Account | GM1 | Gross Margin |

Accordingly, commenting database tables 301-306 are be populated as follows:

Thread table 302 associates threads (e.g., thread identifications (IDs)) and data models:

| Threadid | cubeid |
|---|---|
| T1 | Model1 |
| T2 | Model1 |
| T3 | Model1 |

Comment table 301 associates comments (e.g., comment IDs) and threads (e.g., thread IDs) and users (creator IDs:

| commentid | threadid | commenttext | creatorid |
|---|---|---|---|
| C1 | T1 | test-comment1 | userA |
| C2 | T2 | test-coment2 | userB |
| C3 | T3 | test-coment3 | userC |

Coordinate table 303 associates threads (thread IDs) and dimensions members (dimension member IDs):

| threadid | dimensionmemberid |
|---|---|
| T1 | DM1 |
| T1 | DM2 |
| T1 | DM3 |
| T2 | DM4 |
| T2 | DM2 |
| T2 | DM3 |
| T3 | DM5 |
| T3 | DM2 |
| T3 | DM3 |

DimensionContext table 304 associates threads, dimensions, context, and cache IDs.

| dimensioncontextid | threadid | dimensionid | context | cacheid |
|---|---|---|---|---|
| DC1 | T1 | Product | {member: {values: [PD21]}} | Ch1 |
| DC2 | T1 | Location | {member: {values: [CT2]}} | Ch2 |
| DC3 | T1 | Account | {member: {values: [GM1]}} | Ch3 |
| DC4 | T2 | Product | {member: {values: [PD26]}} | Ch4 |
| DC5 | T2 | Location | {member: {values: [CT2]}} | Ch2 |
| DC6 | T2 | Product | {member: {values: [GM1]}} | Ch3 |
| DC7 | T3 | Product | {member: {values: [PD30]}} | Ch5 |
| DC8 | T3 | Location | {member: {values: [CT2]}} | Ch2 |
| DC9 | T3 | Product | {member: {values: [GM1]}} | Ch3 |

DimensionMember table 305 associates dimension members, dimensions, members, and cache IDs.

| dimensionmemberid | dimensionid | memberid | cacheid |
|---|---|---|---|
| DM1 | Product | PD21 | Ch1 |
| DM2 | Location | CT2 | Ch2 |
| DM3 | Account | GM1 | Ch3 |
| DM4 | Product | PD26 | Ch4 |
| DM5 | Product | PD30 | Ch5 |

CachedLeaves table 306 associates cache IDs with leaves (groups of members).

| cacheid | leaves |
|---|---|
| Ch1 | [PD1, PD2, PD3, PD4] |
| Ch2 | [CT5, CT6] |
| Ch3 | [GM1] |
| Ch4 | [PD11, PD12, PD13] |
| Ch5 | [PD5, PD6] |

Figure 4A:
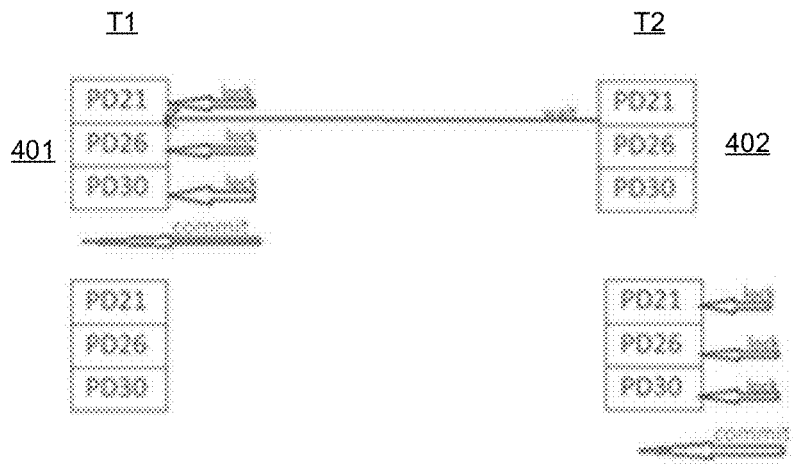
FIG. 4A illustrates batch processing of data updates according to an embodiment.

FIG. 4A illustrates batch processing of data updates according to an embodiment. From the above data entries, it can be seen that for two different threads T1 and T2, the dimensionmemberId DM2 and DM3 are common and comment context is distinguished by DM1 and DM4. When an update occurs for a dimension say Product, all the comment threads that involve Product dimension need to be updated with new context in terms of leaves for the members on which comments were placed. If there are new entries to be added into the leaves column for a given member, this will call for an update to the DimensionMember table for the corresponding memberIds. The request to update is triggered in parallel batches as mentioned above. Each batch will have a database transaction to be performed.

For above example, FIG. 4A illustrates two transactions, T1 and T2, being performed in parallel. Each request sends a list of memberIds to be added/updated into the DimensionMember Table. Transaction T1, List of memberIds to be updated, is shown at 401 and transaction T2, list of memberIds to be updated is shown at 402. Advantageously, because the rows are sorted, both transactions will attempt to update the row, but for one of them the row will be locked. If the rows were unsorted, each transaction may start at different rows, but run into a deadlock when each transaction attempts to access a row locked by the other (e.g., if T1's batch were [PD30,PD26, . . . ] and T2's batch were [PD26, PD30], then T1 would lock PD30 and T2 would lock PD26, resulting in a deadlock). Here, each batch is sorted by the given list of members before processing them for updates.

Steps in resolved query processing in above Transaction for given list of members proceeds as follows:

At time t0, sort both lists of dimension members.

At time t1, Transaction T1 locks the row with membered PD21 and updates the values to the row.

At time t1, Transaction T2 waits for T1 to release the lock on PD21.

At time t2, Transaction T1 locks the row with membered PD26 and updates the values to the row.

At time t2, Transaction T1 locks the row with membered PD30 and updates the values to the row.

At time t2, Transaction T1 is committed, and all the row locks acquired by T1 are released.

At time t3, Transaction T2 locks the row with membered PD26 and updates the values to the row. At time t3, Transaction T2 locks the row with memberId PD21 and updates the values to the row. At time t3, Transaction T2 locks the row with memberId PD26 and updates the values to the row. As the lock is release by T1, T2 will be able to acquire locks on each of the row that needs the update and commits the transaction.

At time t3, Transaction T2 locks the row with memberId PD30 and update the values to the row.

At time t3, Transaction T2 is committed, and all the row locks acquired by T2 are released.

As mentioned above, when a transaction modifies a row in a database, it acquires a row lock on that row to prevent other transactions from modifying it at the same time. The row lock exists until the transaction commits or rolls back. These are row level locks and hence they will be locked one after the other.

The above techniques produce a performance improvement with respect overall database query performance. Millions of rows may be processed in quickly (e.g., microseconds) even with multiple similar concurrent requests, for example. With multiple background jobs getting triggered in parallel, the database may be able to easily scale and complete the database transactions without any database locks or race conditions, for example. The techniques disclosed herein may avoid long waiting blocking queries and thus improve the query timings, for example.

Figure 4B:
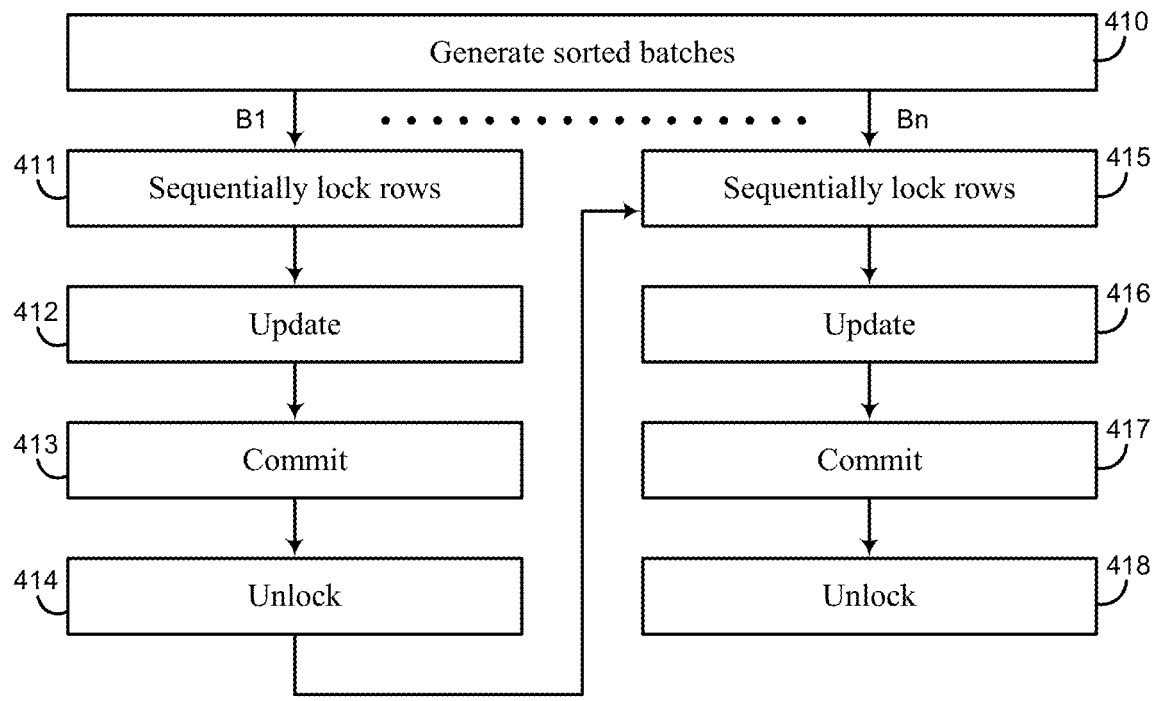
FIG. 4B illustrates a method of batch processing data updates according to an embodiment.

FIG. 4B illustrates a method of batch processing data updates according to an embodiment. At 410, batches of updates are generated and sorted. At 411 and 415, database transactions attempt to access and update the records in each batch in the sorted order. In this example, batch B1 locks the first row before batch Bn is able to do so. Accordingly, batch Bn and any other batches that attempt to access the same row are placed in a wait state. At 411, B1 sequentially locks the rows. The rows are updated at 412. When the database rows in B1 are updated, the updates are committed to the database at 413. At 414, the rows are unlocked. Accordingly, Bn is able to come out of the wait state and sequentially lock rows at 415, update the rows at 416, and commit the updates to the database at 417. The rows Bn locked are unlocked at 418.

Figure 5:
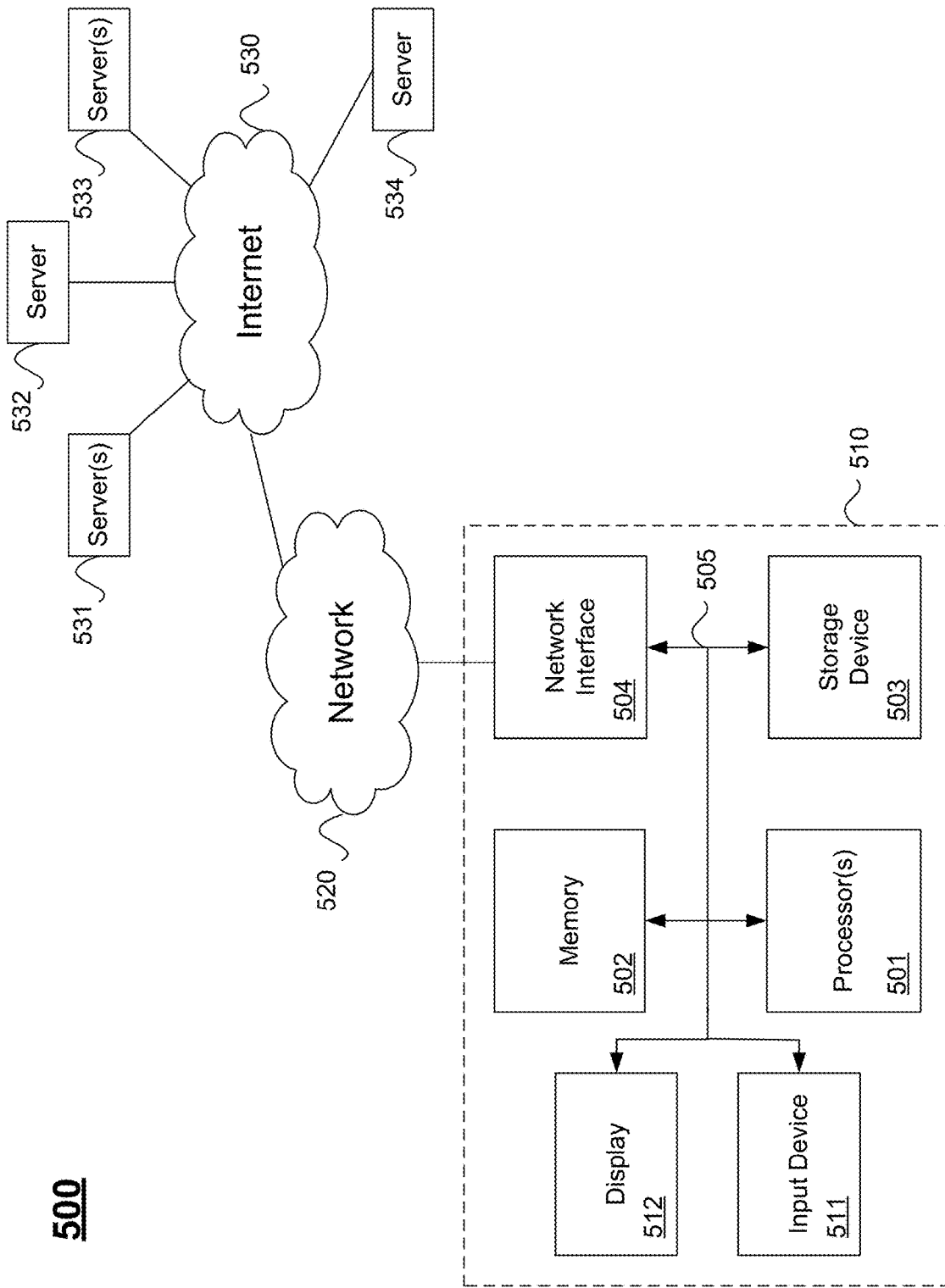
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

Further Examples

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

In some embodiments, the present disclosure includes a method of batch processing database records comprising: storing a plurality of data elements in a database comprising a plurality of tables linked to form a hierarchy, the plurality of data elements comprising a plurality of first data elements and a plurality of second data elements, wherein the plurality of first data elements is stored in a plurality of first records in a first table of the database, and wherein groups of the plurality of first data elements are associated with same second data elements of the plurality of second data elements stored in a plurality of second records in a second table of the database, and wherein the first table and the second table have a many to one relationship where multiple records in the first table are associated with one record in the second table; receiving, on a first computer system, a modification of the hierarchy changing an association between the groups of the plurality of first data elements and corresponding same second data elements; determining, on the first computer system, the second data elements having a changed association with the groups of the plurality of first data elements; dividing, on the first computer system, the second data elements having the changed association into a plurality of batches comprising subsets of the second data elements having the changed association; sorting the subsets of the second data elements having the changed association in each batch; updating, in the database, the subsets of the second data elements having the changed association in each batch by performing a plurality of parallel database transactions.

In some embodiments, updating comprises: performing, on the database, a first database transaction on a first batch having a first subset the second data elements having the changed association, the first database transaction comprising sequentially locking rows comprising the first subset of the second data elements having the changed association in the first batch and sequentially updating each row comprising the first subset of the second data elements having the changed association; and performing, on the database after the first database transaction, a second database transaction on a second batch having a second subset the second data elements having the changed association, the second database transaction comprising sequentially locking rows comprising the second subset the second data elements having the changed association in the second batch and sequentially updating each row comprising the second subset of the second data elements having the changed association.

In some embodiments, the method further comprising, prior to performing the second database transaction: after sequentially updating each row, committing updates to the database for the first subset of the second data elements having the changed association; and unlocking the rows comprising the first subset of the second data elements having the changed association.

In some embodiments, during said first database transaction, the second database transaction attempts to access a particular row locked by the first database transactions, and in response thereto, the second database transaction enters a wait state to prevent a database deadlock.

In some embodiments, the first data elements are comments associated with a plurality of dimensions, and wherein the second data elements are dimensions.

In some embodiments, the database comprises: a thread table storing threads associated with the comments stored in a comments table; a dimension member table storing dimensions; and a coordinates table associating dimensions in the dimensions table with a plurality of threads in thread table.

In some embodiments, the database further comprising a cached leaves table comprising a plurality of associated dimensions.

In some embodiments, the dimensions are dimension identifications:

In some embodiments, the first computer system is a backend application server.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of batch processing database records comprising:
    storing a plurality of data elements in a database comprising a plurality of tables linked to form a hierarchy, the plurality of data elements comprising a plurality of first data elements and a plurality of second data elements,
        wherein the plurality of tables comprises a comments table, a dimension member table, a coordinates table, and a thread table, and
        wherein the plurality of first data elements are comments stored in a plurality of first records in the comments table of the database, and
        wherein groups of the plurality of first data elements are associated with same second data elements of the plurality of second data elements, wherein the second data elements are dimensions stored in a plurality of second records in the dimension member table of the database, and
        wherein the thread table stores threads associated with the comments stored in the comments table, and
        wherein the coordinates table associate dimensions in the dimension member table with a plurality of threads in the thread table, and
        wherein the comments table and the dimension member table have a many to one relationship where multiple records in the comments table are associated with one record in the dimension member table;
    receiving, on a first computer system, a modification of the hierarchy changing an association between the groups of the plurality of first data elements and corresponding same second data elements;
    determining, on the first computer system, the second data elements having a changed association with the groups of the plurality of first data elements;
    dividing, on the first computer system, the second data elements having the changed association into a plurality of batches comprising subsets of the second data elements having the changed association;
    sorting the subsets of the second data elements having the changed association in each batch; and
    updating, in the database, the subsets of the second data elements having the changed association in each batch by performing a plurality of parallel database transactions, including:
        performing a first database transaction on a first batch having a first subset the second data elements having the changed association, the first database transaction comprising sequentially locking rows comprising the first subset of the second data elements having the changed association in the first batch and sequentially updating each row comprising the first subset of the second data elements having the changed association, wherein, during the first database transaction, a second database transaction attempts to access a particular row locked by the first database transactions, and in response thereto, the second database transaction enters a wait state to prevent a database deadlock; and
        performing, after the first database transaction, the second database transaction on a second batch having a second subset the second data elements having the changed association, the second database transaction comprising sequentially locking rows comprising the second subset the second data elements having the changed association in the second batch and sequentially updating each row comprising the second subset of the second data elements having the changed association.

2. The method of claim 1, further comprising, prior to performing the second database transaction:
    after sequentially updating each row, committing updates to the database for the first subset of the second data elements having the changed association; and
    unlocking the rows comprising the first subset of the second data elements having the changed association.

3. The method of claim 1, the database further comprising a cached leaves table comprising a plurality of associated dimensions.

4. The method of claim 1, wherein the dimensions are dimension identifications.

5. The method of claim 1, wherein the first computer system is a backend application server.

6. A computer system comprising:
    at least one processor;
    at least one non-transitory computer readable medium storing computer executable instructions that, when executed by the at least one processor, cause the computer system to perform a method comprising:
    storing a plurality of data elements in a database comprising a plurality of tables linked to form a hierarchy, the plurality of data elements comprising a plurality of first data elements and a plurality of second data elements,
        wherein the plurality of tables comprises a comments table, a dimension member table, a coordinates table, and a thread table, and
        wherein the plurality of first data elements are comments stored in a plurality of first records in the comments table of the database, and
        wherein groups of the plurality of first data elements are associated with same second data elements of the plurality of second data elements, wherein the second data elements are dimensions stored in a plurality of second records in the dimension member table of the database, and
        wherein the thread table stores threads associated with the comments stored in the comments table, and
        wherein the coordinates table associate dimensions in the dimension member table with a plurality of threads in the thread table, and
        wherein the comments table and the dimension member table have a many to one relationship where multiple records in the comments table are associated with one record in the dimension member table;
    receiving, on a first computer system, a modification of the hierarchy changing an association between the groups of the plurality of first data elements and corresponding same second data elements;
    determining, on the first computer system, the second data elements having a changed association with the groups of the plurality of first data elements;
    dividing, on the first computer system, the second data elements having the changed association into a plurality of batches comprising subsets of the second data elements having the changed association;
    sorting the subsets of the second data elements having the changed association in each batch; and
    updating, in the database, the subsets of the second data elements having the changed association in each batch by performing a plurality of parallel database transactions, including:

performing a first database transaction on a first batch having a first subset the second data elements having the changed association, the first database transaction comprising sequentially locking rows comprising the first subset of the second data elements having the changed association in the first batch and sequentially updating each row comprising the first subset of the second data elements having the changed association, wherein, during the first database transaction, a second database transaction attempts to access a particular row locked by the first database transactions, and in response thereto, the second database transaction enters a wait state to prevent a database deadlock; and performing, after the first database transaction, the second database transaction on a second batch having a second subset the second data elements having the changed association, the second database transaction comprising sequentially locking rows comprising the second subset the second data elements having the changed association in the second batch and sequentially updating each row comprising the second subset of the second data elements having the changed association.

7. The computer system of claim 6, further comprising, prior to performing the second database transaction:

after sequentially updating each row, committing updates to the database for the first subset of the second data elements having the changed association; and unlocking the rows comprising the first subset of the second data elements having the changed association.

8. The computer system of claim 6, the database further comprising a cached leaves table comprising a plurality of associated dimensions.

9. The computer system of claim 6, wherein the dimensions are dimension identifications.

10. The computer system of claim 6, wherein the first computer system is a backend application server.

11. A non-transitory computer-readable medium storing computer-executable instructions that, when executed by at least one processor, perform a method of moving data, the method comprising:

storing a plurality of data elements in a database comprising a plurality of tables linked to form a hierarchy, the plurality of data elements comprising a plurality of first data elements and a plurality of second data elements, wherein the plurality of tables comprises a comments table, a dimension member table, a coordinates table, and a thread table, and wherein the plurality of first data elements are comments stored in a plurality of first records in the comments table of the database, and wherein groups of the plurality of first data elements are associated with same second data elements of the plurality of second data elements, wherein the second data elements are dimensions stored in a plurality of second records in the dimension member table of the database, and wherein the thread table stores threads associated with the comments stored in the comments table, and wherein the coordinates table associate dimensions in the dimension member table with a plurality of threads in the thread table, and wherein the comments table and the dimension member table have a many to one relationship where multiple records in the comments table are associated with one record in the dimension member table;

receiving, on a first computer system, a modification of the hierarchy changing an association between the groups of the plurality of first data elements and corresponding same second data elements;

determining, on the first computer system, the second data elements having a changed association with the groups of the plurality of first data elements;

dividing, on the first computer system, the second data elements having the changed association into a plurality of batches comprising subsets of the second data elements having the changed association;

sorting the subsets of the second data elements having the changed association in each batch; and updating, in the database, the subsets of the second data elements having the changed association in each batch by performing a plurality of parallel database transactions including performing a first database transaction on a first batch having a first subset the second data elements having the changed association, the first database transaction comprising sequentially locking rows comprising the first subset of the second data elements having the changed association in the first batch and sequentially updating each row comprising the first subset of the second data elements having the changed association, and performing a second database transaction after the first database transaction, on a second batch having a second subset the second data elements having the changed association, the second database transaction comprising sequentially locking rows comprising the second subset the second data elements having the changed association in the second batch and sequentially updating each row comprising the second subset of the second data elements having the changed association, wherein, during said first database transaction, the second database transaction attempts to access a particular row locked by the first database transactions, and in response thereto, the second database transaction enters a wait state to prevent a database deadlock.

12. The non-transitory computer-readable medium of claim 11, further comprising, prior to performing the second database transaction:

after sequentially updating each row, committing updates to the database for the first subset of the second data elements having the changed association; and unlocking the rows comprising the first subset of the second data elements having the changed association.

13. The non-transitory computer-readable medium of claim 11, the database further comprising a cached leaves table comprising a plurality of associated dimensions.

14. The non-transitory computer-readable medium of claim 11, wherein the dimensions are dimension identifications.

15. The non-transitory computer-readable medium of claim 11, the first computer system is a backend application server.

* * * * *